United States Patent
Jung et al.

(10) Patent No.: US 12,321,586 B2
(45) Date of Patent: Jun. 3, 2025

(54) INDUCTION HEATING DEVICE PROVIDING IMPROVED USER EXPERIENCE AND USER INTERFACE

(71) Applicant: LG Electronics Inc., Seoul (KR)

(72) Inventors: Mijin Jung, Seoul (KR); Hyeonna Han, Seoul (KR)

(73) Assignee: LG Electronics Inc., Seoul (KR)

( * ) Notice: Subject to any disclaimer, the term of this patent is extended or adjusted under 35 U.S.C. 154(b) by 833 days.

(21) Appl. No.: 17/604,569

(22) PCT Filed: Apr. 16, 2020

(86) PCT No.: PCT/KR2020/005082
§ 371 (c)(1),
(2) Date: Oct. 18, 2021

(87) PCT Pub. No.: WO2020/213948
PCT Pub. Date: Oct. 22, 2020

(65) Prior Publication Data
US 2022/0197461 A1    Jun. 23, 2022

(30) Foreign Application Priority Data
Apr. 18, 2019 (KR) .................. 10-2019-0045751

(51) Int. Cl.
*G06F 3/0488* (2022.01)
*G06F 3/04817* (2022.01)
(Continued)

(52) U.S. Cl.
CPC ........ *G06F 3/0488* (2013.01); *G06F 3/04817* (2013.01); *G06F 3/0482* (2013.01);
(Continued)

(58) Field of Classification Search
CPC .................................................. G06F 3/0488
(Continued)

(56) References Cited

U.S. PATENT DOCUMENTS

2009/0258331 A1*  10/2009  Do ................. G09B 21/003
                                                                434/127
2015/0068408 A1    3/2015  Nagae et al.
(Continued)

FOREIGN PATENT DOCUMENTS

DE   112008002807       9/2013
DE   102018101745 A1 *  8/2019  ............ F24C 15/102
(Continued)

OTHER PUBLICATIONS

Extended European Search Report in European Appln. No. 20791508.3, mailed on Dec. 8, 2022, 10 pages.

*Primary Examiner* — Brian W Jennison
*Assistant Examiner* — Daniel Ward Hatten
(74) *Attorney, Agent, or Firm* — Fish & Richardson P.C.

(57) ABSTRACT

An induction heating device includes a case, working coils, a cover plate coupled to the case, an input interface buried into the cover plate and configured to receive a touch input from a user and to display image, a first control module configured to sense which working coil has a first object to be heated, a second control module configured to receive first position information of the first object from the first control module, to determine a size of the first object based on the first position information, and to receive first input information on the touch input in relation to heating conditions of the first object, and a memory configured to receive the first input information and first size information on the size of the first object from the second control module, and to match and store the first input information and the first size information.

14 Claims, 5 Drawing Sheets

(51) Int. Cl.
*G06F 3/0482* (2013.01)
*H05B 6/06* (2006.01)
*H05B 6/12* (2006.01)

(52) U.S. Cl.
CPC ........... *H05B 6/065* (2013.01); *H05B 6/1218* (2013.01); *H05B 6/1272* (2013.01)

(58) Field of Classification Search
USPC ......................................................... 219/622
See application file for complete search history.

(56) References Cited

U.S. PATENT DOCUMENTS

2018/0168005 A1* 6/2018 Yun .................. H05B 6/062
2018/0180293 A1* 6/2018 Holzinger ........... G06F 3/04886
2020/0196398 A1   6/2020 Ok et al.

FOREIGN PATENT DOCUMENTS

| EP | 3013120 |  | 4/2016 | |
| EP | 3013120 A1 * | 4/2016 | ............... H05B 6/06 |
| JP | 2009238613 |  | 10/2009 | |
| JP | 5867330 |  | 2/2016 | |
| JP | 6052585 |  | 12/2016 | |
| JP | 6227162 |  | 11/2017 | |
| KR | 20190024546 |  | 3/2019 | |

\* cited by examiner

[Fig. 1]
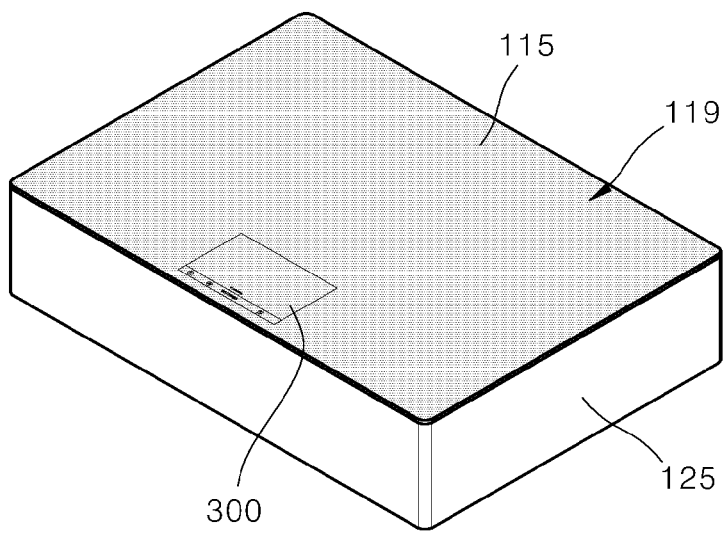
[Fig. 2]
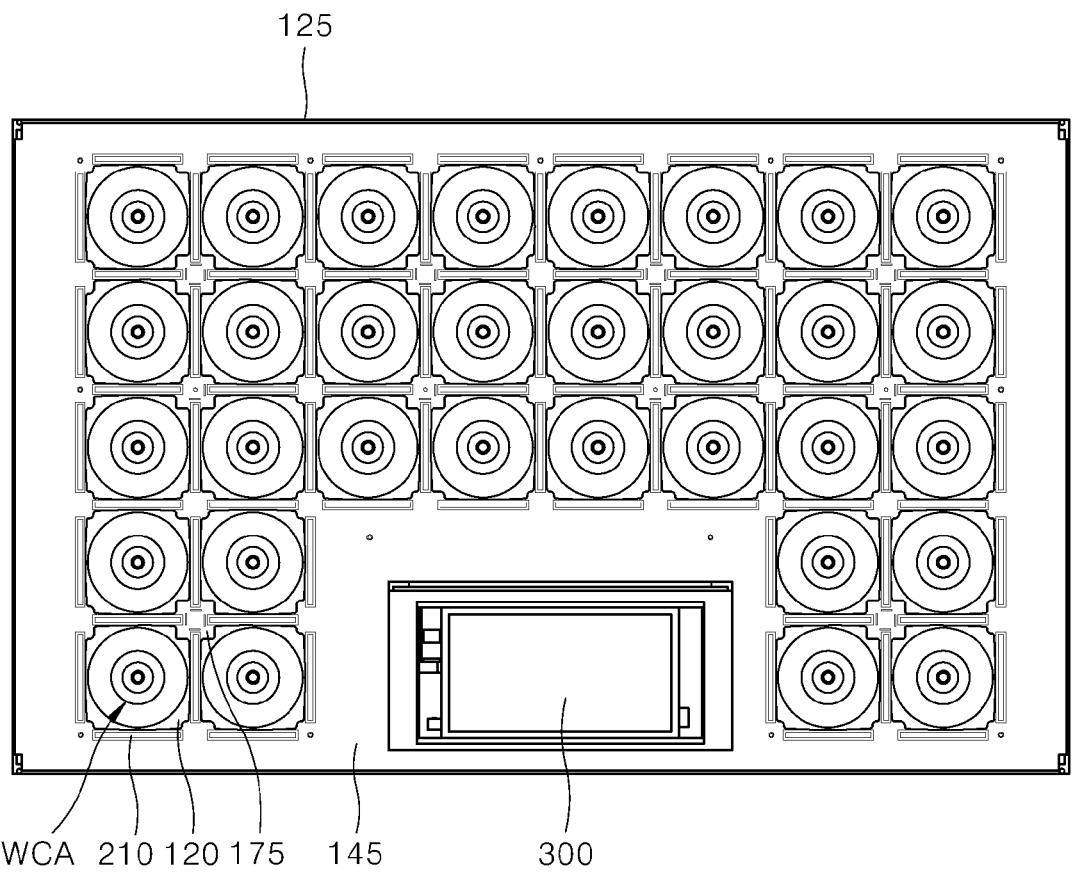

[Fig. 3]
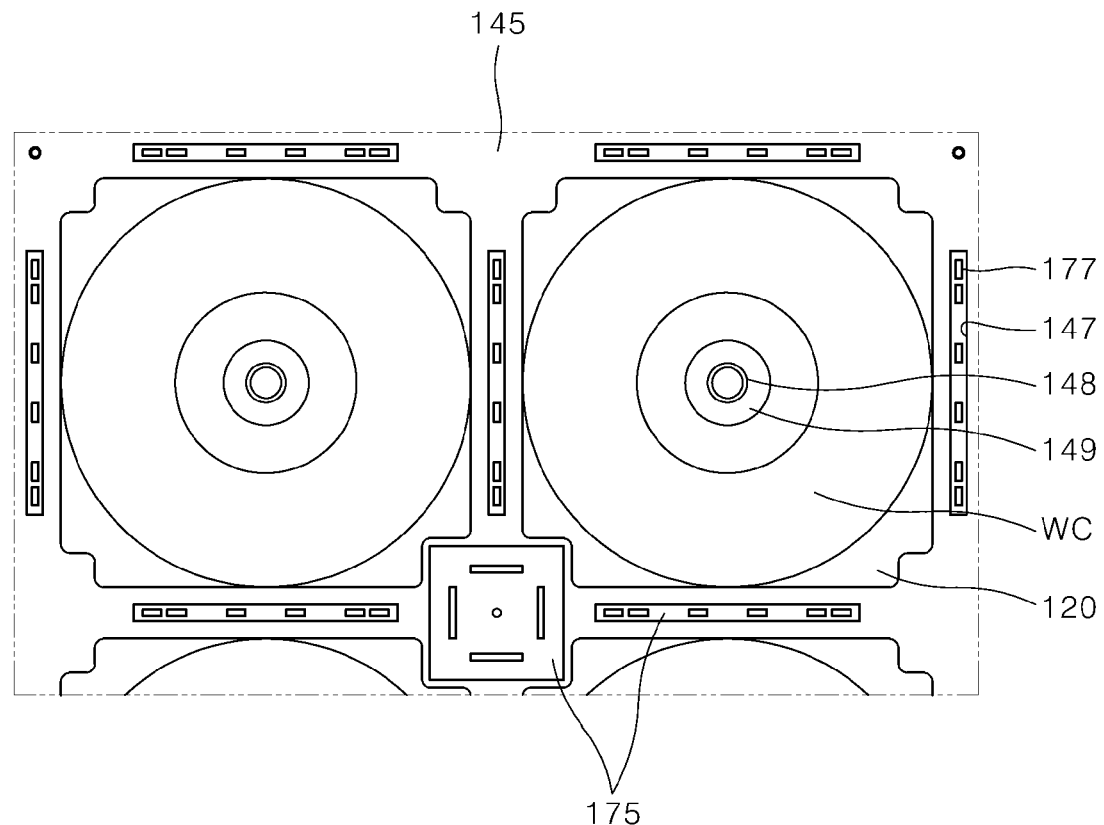
[Fig. 4]
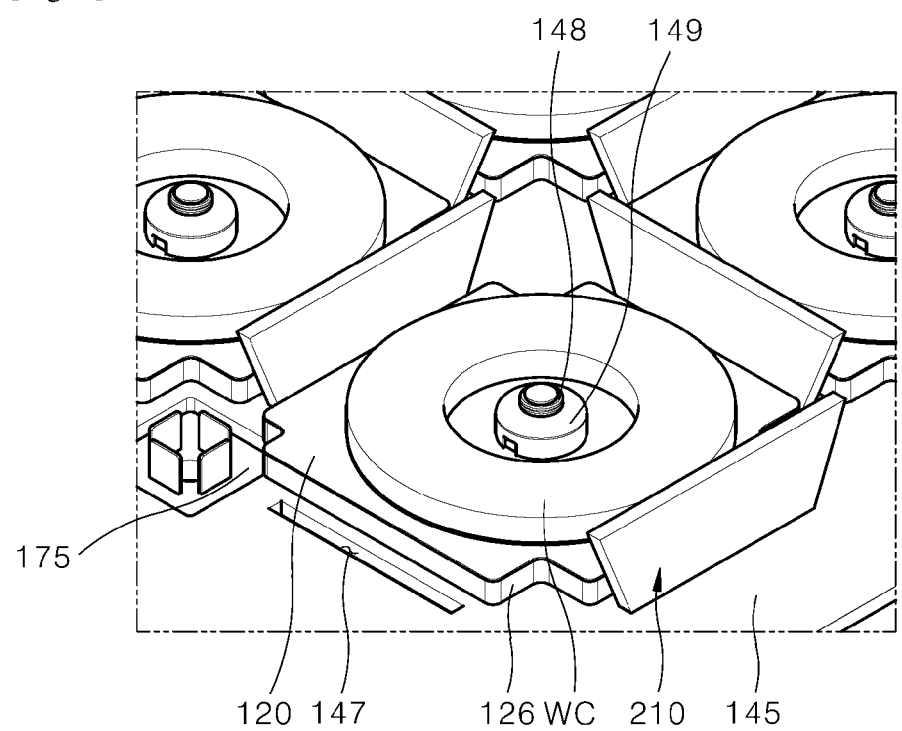

[Fig. 5]
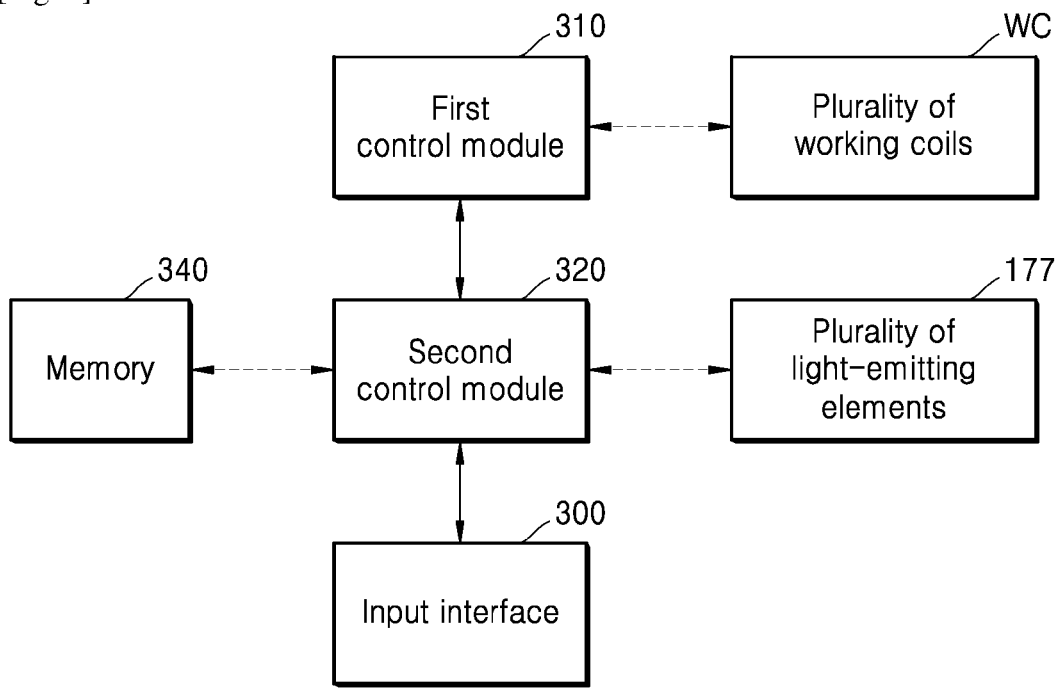
[Fig. 6]
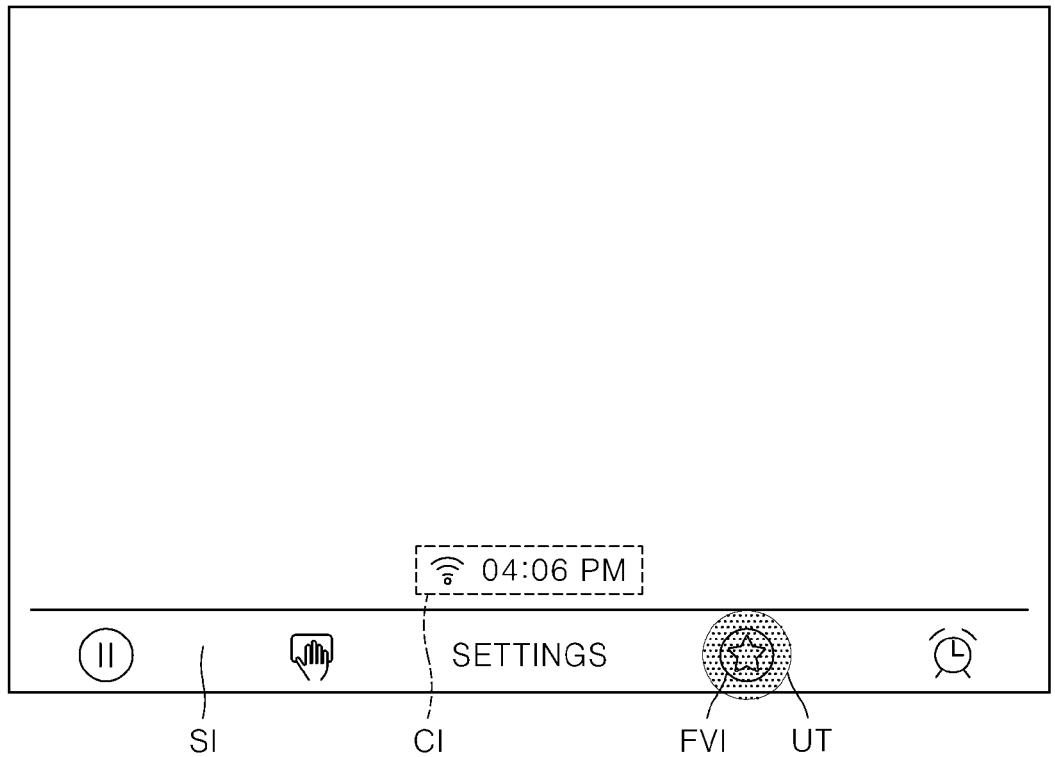

[Fig. 7]
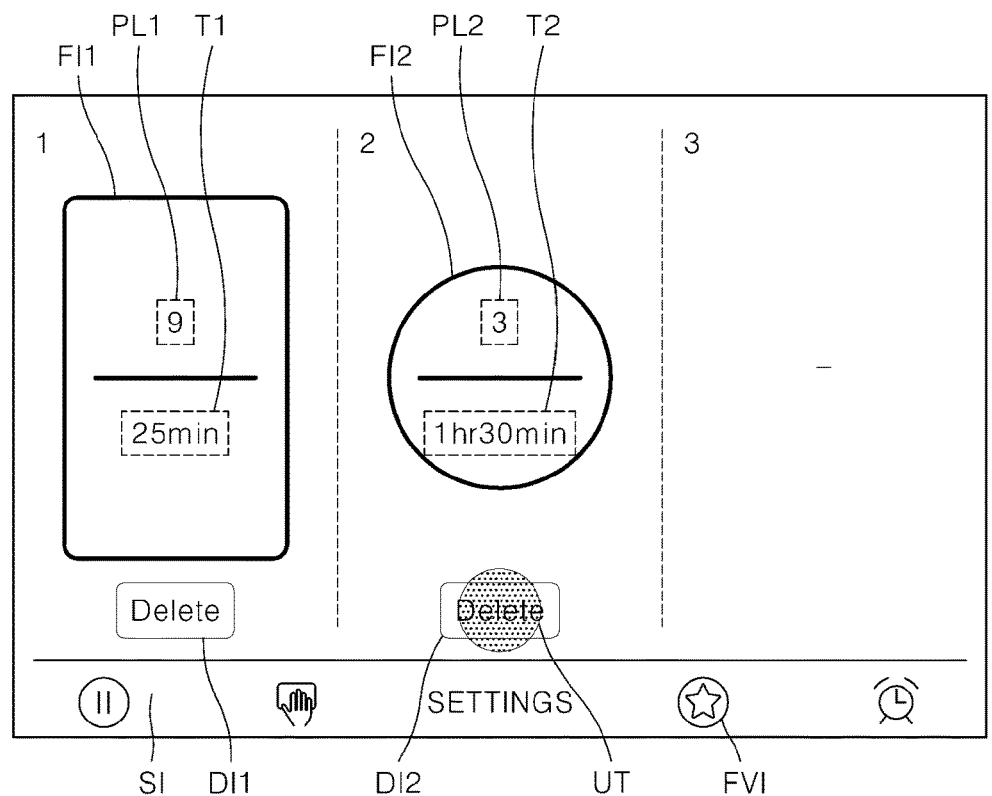
[Fig. 8]
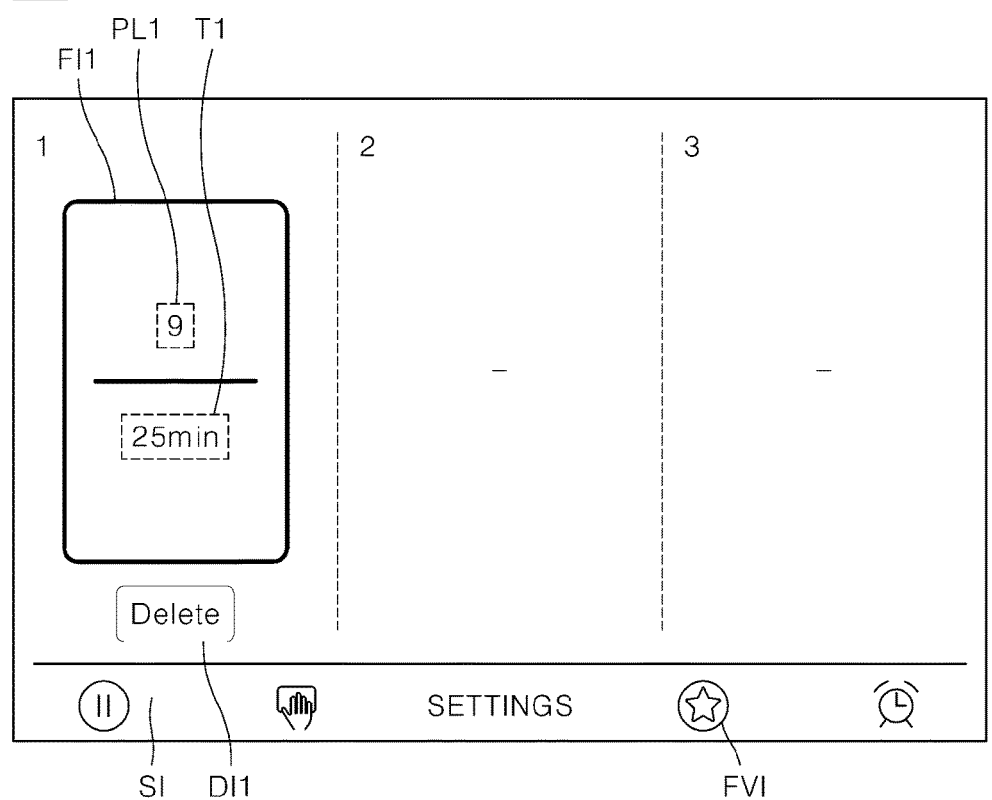

[Fig. 9]
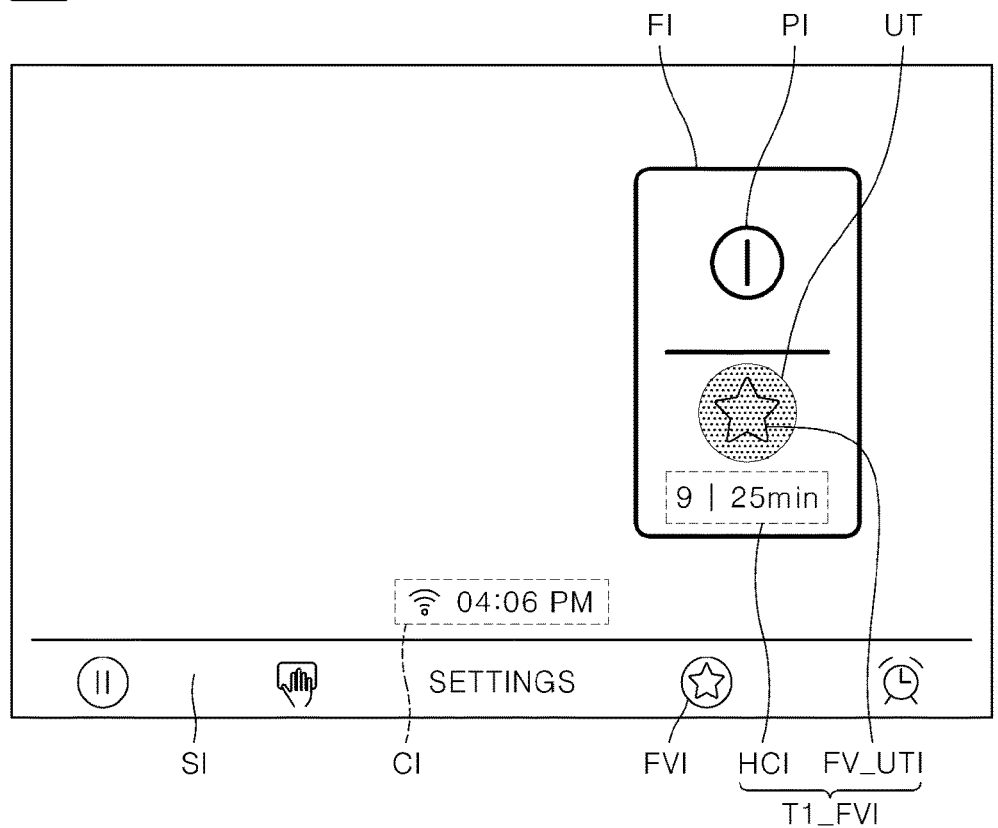
[Fig. 10]
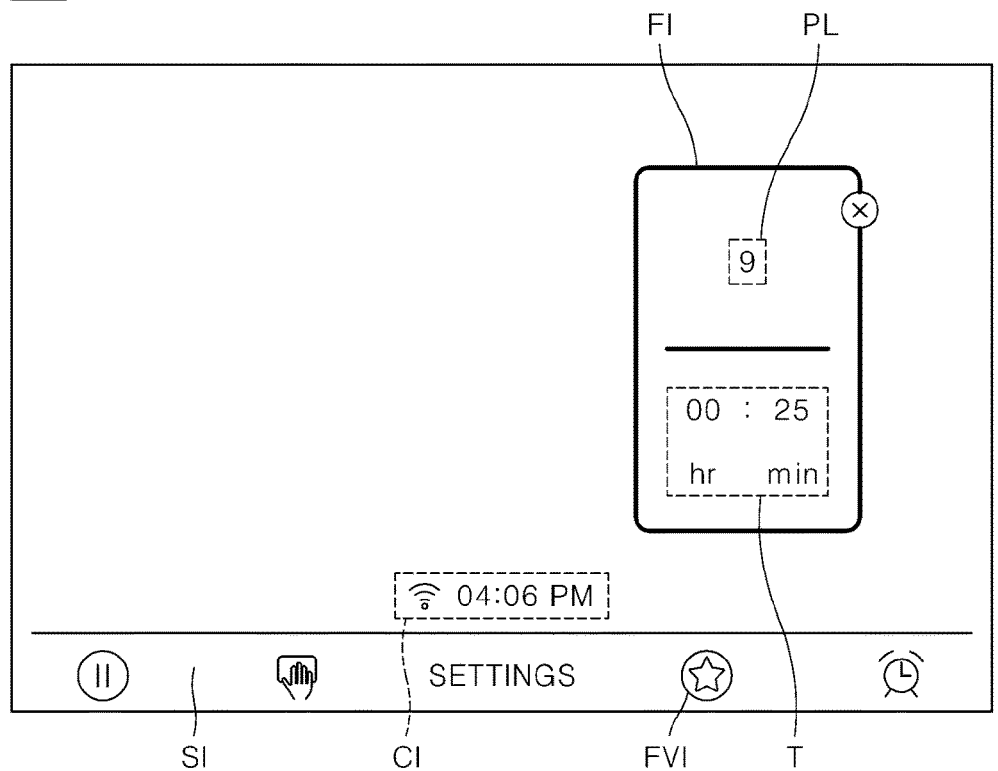

INDUCTION HEATING DEVICE PROVIDING IMPROVED USER EXPERIENCE AND USER INTERFACE

CROSS-REFERENCE TO RELATED APPLICATIONS

This application is a National Stage application under 35 U.S.C. § 371 of International Application No. PCT/KR2020/005082, filed on Apr. 16, 2020, which claims the benefit of Korean Patent Application No. 10-2019-0045751, filed on Apr. 18, 2019. The disclosures of the prior applications are incorporated by reference in their entirety.

TECHNICAL FIELD

The present invention relates to an induction heating device that can provide improved user experience (UX) and user interface (UI).

BACKGROUND ART

Various types of cooking apparatuses are used to heat food at homes and restaurants. Conventionally, gas ranges that are fueled by gas have been widely used. However, in recent years, apparatuses that are used to heat an object subject to heating such as a vessel including a pot, using electricity instead of gas, have been used.

Methods for heating an object subject to heating using electricity are broadly classified as a resistance heating method and an induction heating method.

The resistance heating method is a method by which an object subject to heating is heated by heat that is generated when electric current flows through a metallic resistance wire, or through a non-metallic heating element such as silicon carbide and that then is delivered to the object subject to heating (e.g., a cooking vessel) through radiation or conduction.

The induction heating method is a method by which an object subject to heating itself is heated by eddy currents that are generated in the object subject to heating, which is comprised of metallic ingredients, using a magnetic field that is generated around a coil when a predetermined magnitude of high-frequency power is supplied to the coil.

An induction heating device to which the method of induction heating is applied is generally provided with a working coil respectively in a corresponding area to heat each of the plurality of objects subject to heating (e.g., a cooking vessel).

However, recently, an induction heating device (i.e., a zone free-type induction heating device), in which a plurality of working coils simultaneously heat a single object, has been widely used. The zone free-type induction heating device may inductively heat an object subject to heating regardless of a size and position of the object subject to heating in an area where a plurality of working coils are provided.

A zone free-type induction heating device is disclosed in Japanese Patent No. 6052585B2.

The zone free-type induction heating device may be provided with an input interface. The input interface, which is a module for inputting heating intensity or driving time and the like desired by a user, may be implemented in various different forms including a physical button or a touch panel and the like. Further, the input interface may be provided with a display panel (i.e., a touch screen-type panel) that displays a driving state (e.g., a burner image for an object subject to heating) of the induction heating device.

The induction heating device of the related art causes inconvenience to the user as the user needs to input heating conditions (i.e., heating intensity and heating time) for heating an object subject to heating on the input interface each time the user places the object subject to heating on a cover plate (i.e., an upper plate) of the induction heating device.

DETAILED DESCRIPTION OF INVENTION

Technical Problems

The embodiment of the present invention is directed to an induction heating device that may automatically advise a user about cooking mode that is often used.

The embodiment of the present invention is also directed to an induction heating device that may provide improved user experience (UX) and user interface (UI).

Aspects of the present invention are not limited to the above-described ones. Additionally, other aspects and advantages that have not been mentioned may be clearly understood from the following description and may be more clearly understood from embodiments. Further, it will be understood that the aspects and advantages of the present invention may be realized via means and combinations thereof that are described in the appended claims.

Solutions to Problem

According to an embodiment, an induction heating device may include a first control module that senses a working coil which has an object subject to heating at an upper side thereof among a plurality of working coils, a second control module that determines a size of the object subject to heating on the basis of information on a position of the object subject to heating supplied by the first control module and that receives input information in relation to heating conditions of the object subject to heating from an input interface, and a memory that matches the input information in relation to heating conditions of the object subject to heating and the information on a size of the object subject to heating supplied by the second control module and that stores the same, thereby making it possible to advise a user about cooking mode that is often used.

According to an embodiment, an induction heating device may include an input interface that is flatly buried into an upper surface of a cover plate, that receives a touch input from a user and that displays a specific image, a second control module that controls a specific image displayed on the input interface on the basis of the touch input supplied by the input interface, and a first control module that controls the driving of at least one of a plurality of working coils on the basis of the touch input supplied by the second control module, thereby making it possible to providing improved user experience and user interface.

Effects of the Invention

The induction heating device may automatically advise a user about cooking mode that is often used on the basis of a size of an object subject to heating, thereby making it possible to ease the inconvenience of inputting heating conditions for heating the object subject to heating, which is caused to the user each time the user cooks.

The induction heating device may ease the inconvenience caused to a user, thereby ensuring improved user convenience and satisfaction.

The induction heating device may provide improved user experience and user interface, thereby enhancing user convenience under different conditions.

DESCRIPTION OF THE DRAWINGS

FIG. 1 is a perspective view illustrating an induction heating device according to an exemplary embodiment of the present invention.

FIG. 2 is a plane view illustrating a state in which some components of the induction heating device in FIG. 1 are omitted according to an exemplary embodiment of the present invention.

FIGS. 3 and 4 are partially enlarged views illustrating the induction heating device in FIG. 2 according to an exemplary embodiment of the present invention.

FIG. 5 is a block diagram for describing a flow of control of the induction heating device in FIG. 1 according to an exemplary embodiment of the present invention.

FIGS. 6 to 10 are views for describing a bookmark function of the induction heating device in FIG. 1 according to an exemplary embodiment of the present invention.

DETAILED DESCRIPTION OF EMBODIMENTS

The above-described aspects, features and advantages are specifically described with reference to the accompanying drawings hereunder such that one having ordinary skill in the art to which the present invention pertains may easily implement the technical spirit of the invention. In describing the invention, detailed description of known technologies in relation to the invention is omitted if it is deemed to make the gist of the present invention unnecessarily vague. Below, preferred embodiments of the present invention are specifically described with reference to the accompanying drawings. Throughout the drawings, identical reference numerals denote identical or similar components.

When any component is described as being "at an upper portion (or a lower portion)" of a component, or "on (or under)" a component, any component may be placed on the upper surface (or the lower surface) of the component, and an additional component may be interposed between the component and any component placed on (or under) the component.

When a component is described as being "connected," "coupled" or "connected" to another component, the components may be directly connected or coupled; however, it is also to be understood that an additional component may be "interposed" between the components, or the components may be "connected," "coupled" or "connected" through an additional component.

Below, an induction heating device according to an embodiment is described.

FIG. 1 is a perspective view illustrating an induction heating device according to an exemplary embodiment of the present invention. FIG. 2 is a plane view illustrating a state in which some components of the induction heating device in FIG. 1 are omitted according to an exemplary embodiment of the present invention. FIGS. 3 and 4 are partially enlarged views illustrating the induction heating device in FIG. 2 according to an exemplary embodiment of the present invention. FIG. 5 is a block diagram for describing a flow of control of the induction heating device in FIG. 1 according to an exemplary embodiment of the present invention.

For convenience of description, FIG. 2 is a view illustrating an induction heating device without a cover plate 119 in FIG. 1, and FIGS. 3 and 4 are views illustrating a state in which some components (e.g., a light guide) of the induction heating device 1 in FIG. 2 are omitted.

Referring to FIGS. 1 to 5, the induction heating device 1 according to an exemplary embodiment of the present invention may include a case 125, a cover plate 119, a base plate 145, an indicator substrate 175, an indicator (i.e., an indicator comprised of a light-emitting element 177 and a light guide 210), an input interface 300, a first control module 310, a second control module 320, a working coil assembly (WCA).

The case 125 may be thermally insulated to prevent heat generated by a working coil (WC) from leaking outwards.

The case 125 may be provided with various components such as the working coil assembly (WCA), the base plate 145, the indicator substrate 175, the light-emitting element 177 and the light guide 210 and the like that constitute the induction heating device 1.

The case 125 may be further provided with various devices (e.g., a power supply that supplies AC power, a rectifier that rectifies AC power of the power supply into DC power, an inverter that converts DC power rectified by the rectifier into a resonance current through a switching operation and that supplies the resonance current to a working coil (WC), a relay or a semiconductor switch that turns on or turns off a working coil (WC), and the like) in relation to the driving of the working coil (WC), an indicator substrate supporter (not illustrated) where an indicator substrate 175 is installed, a blowing fan (not illustrated) that cools heat generated in a working coil (WC) or a light-emitting element 177 and the like. Detailed description in relation to those devices is omitted.

The cover plate 119 may be coupled to an upper end of the case 125 and may shield an inside of the case 125. An object subject to heating (not illustrated) may be placed on an upper surface of the cover plate 119.

Specifically, the cover plate 119 may include an upper plate 115 (i.e., the upper surface of the cover plate 119) for placing an object subject to heating such as a cooking vessel, and heat generated in the working coil (WC) may be delivered to the object subject to heating through the upper plate 115.

The upper plate 115, for example, may be made of a glass material, and an input interface 300 that receives a touch input from a user and delivers the touch input to the second control module 320 may be installed on the upper plate 115.

The input interface 300 may be flatly buried into the upper surface of the cover plate 119, i.e., may be flatly buried into the upper plate 115 (That is, the input interface 300 may be installed flatly on the same flat surface as the upper plate 115.), and may be controlled by the second control module 320 to display a specific image (e.g., a burner image, a remaining heat image, a heating intensity image, a timer image, an image for guiding an optimally changed position and the like.). Further, the input interface 300 may receive a touch input from the user and may supply the received touch input to the second control module 320.

The input interface 300, which is a module for inputting heating intensity or heating time and the like desired by the user, may be implemented in various different forms such as a physical button or a touch panel and the like. Additionally, the input interface 300 may be provided with a display panel (i.e., a touch screen-type panel) that displays a driving state and the like of the induction heating device 1.

The input interface 300 may deliver a touch input supplied by the user to the second control module 320, and the second control module 320 may deliver the touch input to the first control module 310. Detailed description in relation to this is described hereunder.

The working coil assembly (WCA) may include a working coil (WC), a ferrite core 126, and a mica sheet 120 (i.e., a first mica sheet).

In case the induction heating device 1 is a zone free-type induction heating device, a plurality of working coil assemblies (WCA), as illustrated in FIG. 2, may be provided, and the plurality of working coil assemblies (e.g., WCA) may be spaced a predetermined distance apart from each other.

A plurality of working coils (e.g., WC) included in the plurality of working coil assemblies (e.g., WCA) may be controlled individually or in a group.

Specifically, the plurality of working coils, for example, may be controlled in a group such as a first working coil group (i.e., a plurality of working coils disposed in a first area) and a second working coil group (i.e., a plurality of working coils disposed in a second area), and each working coil group may be independently controlled by an individual inverter. Working coils included in each working coil group may be independently controlled by the above-described relay or semiconductor switch.

For convenience of description, a single working coil assembly (WCA) is described as an example.

The working coil (WC) may be comprised of wires that are wound in a ring shape a plurality of times, and may generate an AC magnetic field. Additionally, the driving of the working coil (WC) may be controlled by the first control module 310, and a mica sheet 120 and a ferrite core 126 may be consecutively disposed at a lower side of the working coil (WC).

The ferrite core 126 may be disposed at the lower side of the working coil (WC), and a core hole (not illustrated) may be formed at a central portion of the ferrite core 126 to perpendicularly overlap with a ring-shaped inside of the working coil (WC).

Specifically, a base plate 145 may be disposed at a lower side of the ferrite core 126, and the mica sheet 120 may be disposed between the ferrite core 126 and the working coil (WC).

As illustrated in FIGS. 3 and 4, a packing gasket 149 may be coupled to the corer hole such that the ferrite core 126 is fixed onto the base plate 145. A sensor 148 may be installed at an upper end of the packing gasket 149. The sensor 148 may sense a temperature of the upper plate 115, and a temperature or an operation and the like of the working coil (WC), and may deliver temperature information or operation information and the like to the above-described second control module 320 or the first control module 310.

The ferrite core 126 may be fixed to the mica sheet 120 through a sealant, and may spread an AC magnetic field generated in the working coil (WC).

The mica sheet 120 (i.e., a first mica sheet) may be disposed between the working coil (WC) and the ferrite core 126, and may be provided with a sheet hole (not illustrated) at a central portion thereof to perpendicularly overlap with the ring-shaped inside of the working coil (WC).

The mica sheet 120 may be fixed to the working coil (WC) and the ferrite core 126 through a sealant, and may prevent heat generated by the working coil (WC) from being directly delivered to the ferrite core 126.

Though not illustrated in the drawings, the working coil assembly (WCA) may further include a second mica sheet (not illustrated) that is fixed to the upper end of the working coil (WC) through a sealant and that is provided with a second sheet hole (not illustrated) formed at a central portion of the second mica sheet to perpendicularly overlap with the ring-shaped inside of the working coil (WC).

For convenience of description, detailed description in relation to the second mica sheet is omitted.

The working coil assembly (WCA) may be installed at the base plate 145.

Specifically, the ferrite core 126, the mica sheet 120, and the working coil (WC) may be consecutively stacked on the base plate 145. An indicator substrate 175 may be placed to be spaced apart from the base plate 145 at a lower side of the base plate 145.

The base plate 145, for example, may be integrally formed and may be made of aluminum (Al), but not be limited Further, the base plate 145 may be provided with a light guide 210.

Specifically, the light guide 210 may be provided around the working coil (WC) at the base plate 145. That is, four light guides (e.g., 210) per a single working coil (WC) may be installed around the working coil (WC).

The light guide 210 may display light, emitted from a light-emitting element 177, through a light-emitting surface (i.e., an upper surface) of an upper end thereof, and may display whether the working coil (WC) operates and may display output intensity (i.e., heating intensity) of the working coil (WC). Each light guide 210 may be installed at each light guide installation hole 147 formed at the base plate 145.

The light guide installation hole 147 for installing a light guide 210, as illustrated in FIGS. 3 and 4, may be formed at the base plate 145 in a space between the ferrite cores. That is, the light guide installation hole 147 may be formed at the base plate 145 along a position where the light guide 210 is installed. Accordingly, the light guide installation hole 147 may also be formed around a working coil (WC), and four light guide installation holes (e.g., 147) per a single working coil (WC) may be formed around the working coil (WC).

The number of the light guide installation holes 147 may be the same as the number of the light guides 210.

Light emitted from a light-emitting element 177 installed at the indicator substrate 175 may be delivered to the light guide 210 through the light guide installation hole 147. Accordingly, the light guide 210 may display whether the working coil (WC) operates and may display output intensity (i.e., heating intensity) of the working coil (WC).

The indicator substrate 175 may be spaced apart from the base plate 145 at the lower side of the base plate 145, and a light-emitting element 177 may be installed at the indicator substrate 175.

Specifically, the indicator substrate 175 may be installed on an indicator substrate supporter (not illustrated) to be spaced downwards apart from the base plate 145. The indicator substrate 175, for example, may be implemented in the form of a printed circuit board (PCB). Though not illustrated in the drawings, the indicator substrate 175 may be further provided with various components for driving the light-emitting element 177.

As illustrated in FIG. 3, a plurality of light-emitting elements (e.g., 177) may be provided and may be installed at the indicator substrate 175 (i.e., a lower side of the light guide 210) through the light guide installation hole 147 to be exposed upwards. Accordingly, light emitted from the light-emitting element 177 may be delivered to the light guide 210 through the light guide installation hole 147.

The plurality of light-emitting elements (e.g., 177), for example, may include a light-emitting diode (LED) respectively, and may be controlled by the second control module 320.

The first control module 310 may control the driving of the plurality of working coils (e.g., WC).

The first control module 310 may detect a degree to which a resonance current flowing in each working coil is reduced, and, on the basis of results of the detection, may sense a working coil that has an object subject to heating at an upper side thereof.

In case an object subject to heating is placed on a working coil (WC), the entire resistance may be increased due to resistance of the object subject to heating. Accordingly, a degree of a reduction in resonance currents flowing in the working coil (WC) may be increased.

The first control module 310, as described above, detects a resonance current flowing in a working coil (WC), and, on the basis of a value of the detection, may detect whether an object subject to heating is placed on the working coil (WC).

Certainly, the first control module 310 may sense an object subject to heating using another method. In the embodiment, the above-described method used to detect an object subject to heating is described as an example.

The first control module 310 may supply information of a position of the sensed object subject to heating to the second control module 320 and may receive a user's touch input from the second control module 320.

Certainly, the first control module 310 may control the driving of at least one of the plurality of working coils (e.g., WC) on the basis of the user's touch input supplied by the second control module 320.

The second control module 320 may control an image displayed on the input interface 300 and the driving of the plurality of light-emitting elements (e.g., 177). Further, the second control module 320 may supply information to a memory 340 (That is, the second control module may write new data to the memory 340.) or may receive information from the memory 340 (That is, the second control module may read data stored in the memory 340.) and may delete information stored in the memory 340.

Specifically, the second control module 320 may receive information (e.g., information on a user's touch input in relation to heating conditions of an object subject to heating) on a user's touch input from the input interface 300, and may supply the received information on the touch input to the first control module 310 or the memory 340 or may control the input interface 300 or the light-emitting element 177 on the basis of the received information on the touch input.

Additionally, the second control module 320 may receive information on a position of an object subject to heating from the first control module 310, and, on the basis of the received information on the position of the object subject to heating, may determine a size of the object subject to heating. Further, the second control module 320 may compare information on the determined size of the object subject to heating with information on sizes of one or more objects subject to heating stored in the memory 340, and, on the basis of results of the comparison, may operate. Description in relation to this is provided hereunder.

The memory 340 may receive the information on the size (i.e., size information) of the object subject to heating and the information on the touch input (i.e., input information) received from the user in relation to heating conditions of the object subject to heating from the second control module 320, and may match the received size information and input information and may store the same.

Input information on heating conditions (i.e., input information on heating intensity and heating time) and size information of each of one or more objects subject to heating, the position of which is sensed by the first control module 310, are mutually matched and stored as book mark information in the memory 340. Additionally, images that represent one or more pieces of bookmark information (i.e., a bookmark icon (FVI in FIG. 6)) stored in the memory 340 may be displayed on the input interface 300. Detailed description in relation to this is provided hereunder.

The induction heating device 1 according to an embodiment may also perform the function of wireless power transmission on the basis of the above-described configurations and features.

In recent years, technologies for wirelessly supplying power have been developed and have been widely used for various types of electronic devices. An electronic device, to which the wireless power transmitting technology is applied, can be charged only by being placed on a charge pad without connecting to an additional charge connector. Accordingly, the electronic device, to which the wireless power transmitting technology is applied, requires no cord or no charger, thereby ensuring improved mobility and a reduced size and weight.

The wireless power transmitting technology can be broadly classified as an electromagnetic induction technology using a coil, and a resonance technology using resonance, a radio emission technology for converting electric energy into microwaves and delivering the microwaves and the like. Among the technologies, the electromagnetic induction technology is a technology in which power is transmitted using electromagnetic induction between a primary coil provided at an apparatus for wirelessly transmitting power (e.g., a working coil (WC)) and a secondary coil provided at an apparatus for wirelessly receiving power.

The induction heating technology of an induction heating device 1 is substantially the same as the wireless power transmitting technology using electromagnetic induction, in that an object subject to heating is heated through electromagnetic induction.

Thus, the induction heating device 1 according to an embodiment may perform the functions of wireless power transmission as well as induction heating. Further, the second control module 320 or the first control module 310 may control induction heating mode or wireless power transmitting mode. Accordingly, when necessary, the function of induction heating or the function of wireless power transmission may be optionally performed.

The induction heating device 1 according to an embodiment has the above-described configurations and features. Below, a bookmark function of the induction heating device 1 is described with reference to FIGS. 6 to 10.

FIGS. 6 to 10 are views for describing a bookmark function of the induction heating device in FIG. 1.

FIG. 5 and FIGS. 6 to 8 illustrate a control method of a bookmark list of the induction heating device 1 in FIG. 1.

Specifically, when the induction heating device 1 is turned on, a setting image (SI) that displays a setting icon (e.g., a temporary stop icon, a screen lock icon, a setting list icon, a bookmark icon (FVI), a timer icon and the like), and an auxiliary image (CI) that displays an auxiliary icon (e.g., a Wi-Fi connection state icon and a current time display icon) may be displayed in a partial area of the input interface 300.

The bookmark icon (FVI) is an image that represents one or more pieces of bookmark information stored in the memory 340. In the memory 340, input information on heating conditions and size information of each of one or more objects subject to heating, the position of which is sensed by the first control module 310, are mutually matched and stored as bookmark information.

When the input interface 300 receives a touch input (UT) to a bookmark icon (FVI; i.e., an image that represents one or more pieces of bookmark information) from the user, the input interface 300 may supply information on the touch input (UT) to the bookmark icon (FVI) supplied by the user to the second control module 320.

In this case, the second control module 320 may control the input interface 320 such that each of one or more pieces of bookmark information is changed and displayed into a burner image for an object subject to heating on the input interface 300 on the basis of the information on the touch input (UT) to the bookmark icon (FVI) supplied by the input interface 300.

When each of one or more pieces of bookmark information is changed and displayed into a burner image for an object subject to heating on the input interface 300, each burner image for an object subject to heating may be displayed by applying corresponding size information of an object subject to heating among pieces of size information of an object subject to heating stored in each of one or more pieces of bookmark information. Further, corresponding input information on heating conditions of an object subject to heating among pieces of input information on heating conditions of an object subject to heating stored in each of one or more pieces of bookmark information is displayed inside each burner image for an object subject to heating, and a delete selection image of the burner image for an object subject to heating may be displayed around the burner image for an object subject to heating.

For example, in case two pieces of bookmark information are stored in the memory 340 as illustrated in FIG. 7, the second control module 320 may control the input interface 300 such that the two pieces of bookmark information are respectively changed and displayed into burner images (FI1 and FI2) for first and second objects subject to heating on the input interface 300 on the basis of information on a touch input (UT) to a bookmark icon (FVI) supplied by the input interface 300.

In this case, the burner image (FI1) for the first object subject to heating may be displayed by applying size information of the first object subject to heating. Additionally, input information (i.e., first heating intensity (PL1) and first heating time (T1)) on heating conditions of the first object subject to heating may be displayed inside the burner image (FI1) for the first object subject to heating, and a delete selection image (DI1) of the burner image (FI1) for the first object subject to heating may be displayed around the burner image (FI1) for the first object subject to heating.

Certainly, the burner image (FI2) for the second object subject to heating may be displayed by applying size information on the second object subject to heating. Additionally, input information (i.e., second heating intensity (PL2) and second heating time (T2)) on heating conditions of the second object subject to heating may be displayed inside the burner image (FI2) for the second object subject to heating, and a delete selection image (DI2) of the burner image (FI2) for the second object subject to heating may be displayed around the burner image (FI2) for the second object subject to heating.

Each of the changed burner images (e.g., FI1 and FI2) for an object subject to heating, as illustrated in FIG. 7, may be placed and displayed consecutively on the input interface 300 from left to right on the basis of a specific reference.

For example, the specific reference may be a frequency at which a size of an object subject to heating is sensed (i.e., a frequency at which a burner image for an object subject to heating is used), but not be limited.

When the input interface 300 receives a touch input to a delete selection image of a burner image for a specific object subject to heating from the user, the input interface 300 may supply information on the touch input to the delete selection image supplied by the user to the second control module 320.

In this case, the second control module 320 may control the input interface 300 such that the burner image for the specific object subject to heating displayed on the input interface 300 is deleted on the basis of the information on the touch input to the delete selection image supplied by the input interface 300, and may delete bookmark information corresponding to the deleted burner image for the specific object subject to heating among one or more pieces of bookmark information stored in the memory 340.

For example, in case the user touches a delete selection image (DI2) of the burner image (FI2) for the second object subject to heating, the burner image (FI2) for the second object subject to heating is deleted and the burner image (FI1) for the first object subject to heating is only left on the input interface 300, as illustrated in FIG. 8.

As described above, pieces of bookmark information in a bookmark list may be confirmed, generated and deleted using the above-described method. Below, a bookmark function of the induction heating device 1 in FIG. 1 is described with reference to FIGS. 5, 9 and 10.

Description is provided under the assumption that bookmark information on the first and second objects subject to heating described with reference to FIG. 7 is stored in the memory 340.

Specifically, when an object subject to heating is placed on the upper plate (115 in FIG. 1) of the cover plate (119 in FIG. 1), the first control module 310 may sense a working coil that has the object subject to heating at an upper side thereof among a plurality of working coils (e.g., WC in FIG. 2).

Herein, the first control module 310 may detect a degree to which a resonance current flowing in each working coil is reduced, and, on the basis of results of the detection, may sense a working coil that has the object subject to heating at an upper side thereof.

When sensing a position of the object subject to heating, the first control module 310 may supply information on the sensed position (i.e., position information) of the object subject to heating to the second control module 320.

The second control module 320 may determine a size of the object subject to heating on the basis of the position information supplied by the first control module 310, may compare the information on the determined size (i.e., size information) of the object subject to heating with one or more pieces of size information (i.e., size information on the first and second objects subject to heating in FIG. 7 (i.e., bookmark information on the first and second objects subject to heating)) stored in the memory 340, and, on the basis of results of the comparison, my operate.

In case the determined size of the object subject to heating is the same as a size of any one (i.e., the first object subject to heating) of the first and second objects subject to heating, the second control module 320, as illustrated in FIG. 9, may control the input interface 300 such that a burner image (FI) for the object subject to heating is displayed on the input interface 300 on the basis of the position information supplied by the first control module 310 and the bookmark information (i.e., input information on heating conditions and size information) on the first object subject to heating stored in the memory 340.

The burner image (FI) for the object subject to heating may be displayed in a specific area of the input interface 300 to correspond to the position of the object subject to heating on the cover plate (119. in FIG. 1) and may be displayed by applying the size of the first object subject to heating and a direction of rotation of the second object subject to heating. A power image (PI), and a bookmark image (T1_FVI) in relation to the first object subject to heating may be displayed inside the burner image (FI) for the object subject to heating.

The bookmark image (T1_FVI) in relation to the first object subject to heating may include an image for a user touch (FV_UTI), and an image (HCI) that displays input information on heating conditions of the first object subject to heating. The input information on heating conditions of the first object subject to heating may include information on target heating intensity (PL1 in FIG. 7) and target heating time (T1 in FIG. 7)) of the first object subject to heating.

When the input interface 300 receives a touch input (UT) to the image for a user touch (FV_UTI) from the user in the state in which the burner image (FI) for the object subject to heating is displayed on the input interface 300, the input interface 300 may supply information on the touch input (UT) to the image for a user touch (FV_UTI) supplied by the user to the second control module 320.

The second control module 320 may control the input interface 300 such that a heating intensity image (PL) and a heating time image (T) are displayed inside the burner image (FI) for the object subject to heating on the basis of the information on the touch input (UT) to the image for a user touch (FV_UTI) supplied by the input interface 300, and may supply the information on the touch input (UT) to the image for a user touch (FV_UTI) to the first control module 310, as illustrated in FIG. 10.

Further, the first control module 310 may operate the working coil on which is placed the object subject to heating at an upper side of the one of a plurality of working coils (e.g., WC in FIG. 2) on the basis of the information on the touch input (UT) to the image for a user touch (FV_UTI) supplied by the second control module 320. Certainly, the working coils may be driven in accordance with the heating intensity (PL) and heating time (T).

The heating intensity image (PL) and the heating time image (T) displayed inside the burner image (FI) for the object subject to heating may be respectively the target heating intensity (PL1 in FIG. 7) and target heating time (T1 in FIG. 7) of the first object subject to heating.

In case the input interface 300 receives a touch input to the power image (PI) from the user in the state in which the burner image (FI) for the object subject to heating is displayed on the input interface 300, the input interface 300 may supply information on the touch input to the power image (PI) supplied by the user to the second control module 320.

In this case, the second control module 320 may control the input interface 300 such that an image (not illustrated) for setting target heating intensity and target heating time of the object subject to heating are displayed inside the burner image (FI) for the object subject to heating on the basis of the information on the touch input to the power image (PI) supplied by the input interface 300.

Accordingly, the user may touch the image for setting target heating intensity and target heating time to set new target heating intensity and target heating time and may proceed with the function of heating the object subject to heating.

In case the determined size of the object subject to heating is different from sizes of both of the first and second objects subject to heating, the second control module 320 may control the input interface 300 such that a burner image for the object subject to heating is displayed on the input interface 300 on the basis of the position information supplied by the first control module 310.

Herein, the burner image for the object subject to heating may be displayed in a specific area of the input interface 300 to correspond to the position of the object subject to heating on the cover plate (119. in FIG. 1) and may be displayed by applying a size and a direction of rotation of the object subject to heating. Further, a power image (FI) may be displayed inside the burner image (FI) for the object subject to heating.

In case the input interface 300 receives a touch input to the power image from the user in the state in which the burner image for the object subject to heating is displayed on the input interface 300 as described above, the input interface 300 may supply the touch input to the power image supplied by the user to the second control module 320.

In this case, the second control module 320 may control the input interface 300 such that an image (not illustrated) for setting target heating intensity and target heating time of the object subject to heating is displayed inside the burner image for the object subject to heating displayed on the input interface 300 on the basis of the touch input to the power image supplied by the input interface 300.

In case the input interface 300 receives a touch input in relation to heating conditions (i.e., a selection of heating intensity and heating time) of the object subject to heating from the user in the state in which the image (not illustrated) for setting target heating intensity and target heating time of the object subject to heating is displayed inside the burner image for the object subject to heating, the input interface 300 may supply information on the touch input (i.e., input information) in relation to heating conditions supplied by the user to the second control module 320.

In this case, the second control module 320 may supply size information on the object subject to heating and input information supplied by the input interface 300 in the memory 340, and the memory 340 may match and store the size information and input information supplied by the second control module 320.

Certainly, the size information and input information of the object subject to heating may be mutually matched and stored in the memory 340 as bookmark information.

Further, the second control module 320 supplies the input information supplied by the input interface 300 to the first control module 310, and the first control module 310 may drive working coils disposed at a lower side of the object subject to heating on the basis of the input information supplied by the second control module 320 among a plurality of working coils (e.g., WC in FIG. 2). Certainly, the working coils may be driven in accordance with the input information.

The induction heating device 1 according to an embodiment, as described above, may automatically advise the user about a commonly used cooking mode on the basis of a size of an object subject to heating, thereby easing the inconvenience of inputting heating conditions for heating the object subject to heating, which is caused to the user each time the user cooks. Further, the inconvenience caused to the user may be eased, thereby improving user convenience and satisfaction.

The induction heating device 1 according to an embodiment may provide improved user experience and user interface, thereby enhancing user convenience under different conditions.

The present invention has been described with reference to the embodiments and drawings. The invention may be replaced, modified and changed within the technical spirit of the invention by one having ordinary skill in the art to which the invention pertains. Thus, the invention should not be construed as being limited to the embodiments and drawings set forth herein.

INDUSTRIAL APPLICABILITY

The present invention is applicable to an induction heating device that generates eddy currents in an object subject to heating made of a metallic material using a magnetic field which is generated around a coil when predetermined-magnitude high-frequency power is supplied to the coil such that the object subject to heating itself is heated.

The invention claimed is:

1. An induction heating device, comprising:
a case;
a plurality of working coils provided in the case;
a cover plate that is coupled to an upper end of the case and has an upper surface configured to support a first object to be heated by at least one of the plurality of working coils;
an input interface flatly buried into the upper surface of the cover plate, configured to receive a touch input from a user, and configured to display a specific image;
a first control module configured to sense which one of the plurality of working coils has the first object at an upper side thereof;
a second control module configured to receive first position information on a position of the first object from the first control module, to determine a size of the first object based on the received first position information, and to receive first input information on a touch input supplied by the user in relation to heating conditions of the first object from the input interface; and
a memory configured to receive the first input information and first size information on the determined size of the first object from the second control module, and to match and store the received first input information and the first size information,
wherein the induction heating device is configured to, based on (i) a second object being placed on the upper surface of the cover plate to be heated by at least one of the plurality of working coils and (ii) a size of the second object being equal to the size of the first object, heat the second object using the first input information and the first size information of the first object.

2. The induction heating device of claim 1, wherein, the second object is different from the first object is placed on the upper surface of the cover plate,
the first control module senses a working coil that has the second object at an upper side thereof among the plurality of working coils, and provides second position information on a position of the second object to the second control module, and
the second control module determines the size of the second object based on the second position information supplied by the first control module, compares second size information on the determined size of the second object with the first size information stored in the memory, and operates based on results of the comparison.

3. The induction heating device of claim 2, wherein, based on the determined size of the second object being the same as the size of the first object;
the second control module controls the input interface such that a burner image for the second object is displayed on the input interface based on the second position information supplied by the first control module and based on the first input information and the first size information stored in the memory,
the burner image for the second object is displayed in a specific area of the input interface to correspond to the position of the second object on the cover plate, and
a power image, and a bookmark image in relation to the first object are displayed inside the burner image for the second object.

4. The induction heating device of claim 3, wherein the bookmark image in relation to the first object includes an image for a user touch, and an image that displays the first input information, and
the first input information includes information on target heating intensity and target heating time of the first object.

5. The induction heating device of claim 4, wherein, based on the input interface receiving a touch input to the image for a user touch from the user:
the input interface supplies information on the touch input to the image for a user touch supplied by the user to the second control module,
the second control module controls the input interface such that a target heating intensity image and a target heating time image of the first object is displayed inside the burner image for the second object based on the received information on the touch input to the image for a user touch, and supplies the received information on the touch input to the image for a user touch to the first control module, and
the first control module drives a working coil where the second object is sensed among the plurality of working coils based on the information on the touch input to the image for a user touch supplied by the second control module.

6. The induction heating device of claim 3, wherein, based on the input interface receiving a touch input to the power image from the user:
the input interface supplies information on the touch input to the power image supplied by the user to the second control module, and
the second control module controls the input interface such that images for setting target heating intensity and target heating time of the second object are displayed inside the burner image for the second object based on the received information on the touch input to the power image.

7. The induction heating device of claim 2, wherein, based on the determined size of the second object being different from the size of the first object,
the second control module controls the input interface such that a burner image for the second object is displayed on the input interface based on the second position information supplied by the first control module,
the burner image for the second object is displayed in a specific area of the input interface to correspond to the position of the second object on the cover plate, and is displayed by applying a size and a direction of rotation of the object, and a power image is displayed inside the burner image for the second object.

8. The induction heating device of claim 7, wherein, based on the input interface receiving a touch input to the power image from the user:

the input interface supplies information on the touch input to the power image supplied by the user to the second control module, and the second control module controls the input interface such that images for setting target heating intensity and target heating time of the second object are displayed inside the burner image for the second object based on the received information on the touch input to the power image.

9. The induction heating device of claim 8, wherein, based on the input interface receiving a touch input to heating intensity and heating time of the second object from the user in a state in which the images for setting target heating intensity and target heating time of the second object are displayed inside the burner image for the second object:

the input interface supplies second input information on the touch input to heating intensity and heating time of the second object to the second control module, the second control module supplies the second size information, and the second input information supplied by the input interface to the memory, and the memory matches and stores the second size information and the second input information supplied by the second control module.

10. The induction heating device of claim 1, wherein input information on heating conditions and size information of each of one or more objects, the position of which is sensed by the first control module, are mutually matched and stored in the memory as bookmark information, and an image that represents one or more pieces of bookmark information stored in the memory is displayed on the input interface.

11. The induction heating device of claim 10, wherein, based on the input interface receiving a touch input to the image that represents one or more pieces of bookmark information from the user:

the input interface supplies information on the touch input to the image that represents one or more pieces of bookmark information supplied by the user to the second control module, and the second control module controls the input interface such that each of one or more pieces of bookmark information is changed and displayed into a burner image for an object on the input interface based on the information on the touch input to the image that represents one or more pieces of bookmark information supplied by the input interface.

12. The induction heating device of claim 11, wherein, based on each of one or more pieces of bookmark information being changed and displayed into a burner image for an object on the input interface:

each burner image for an object is displayed by applying corresponding size information of an object among pieces of size information of an object stored in each of one or more pieces of bookmark information, corresponding input information on heating conditions of an object among pieces of input information on heating conditions of an object stored in each of one or more pieces of bookmark information is displayed inside each burner image for an object, and a delete selection image of the burner image for the object is displayed around the burner image for the object.

13. The induction heating device of claim 12, wherein, based on the input interface receiving a touch input to the delete selection image from the user;

the input interface supplies information on the touch input to the delete selection image supplied by the user to the second control module, and the second control module controls the input interface such that the burner image for the object displayed on the input interface is deleted from the input interface based on the information on the touch input to the delete selection image supplied by the input interface, and deletes bookmark information corresponding to the deleted burner image for the object among one or more pieces of bookmark information stored in the memory.

14. The induction heating device of claim 1, wherein the input interface supplies a touch input supplied by the user to the second control module, the second control module controls the specific image displayed on the input interface based on the touch input supplied by the input interface and supplies the touch input to the first control module, and the first control module controls driving of at least one of the plurality of working coils based on the touch input supplied by the second control module.

\* \* \* \* \*